United States Patent
Zermas

(10) Patent No.: US 11,280,608 B1
(45) Date of Patent: Mar. 22, 2022

(54) UAV ABOVE GROUND LEVEL DETERMINATION FOR PRECISION AGRICULTURE

(71) Applicant: Sentera, Inc., Minneapolis, MN (US)

(72) Inventor: Dimitris Zermas, Minneapolis, MN (US)

(73) Assignee: Sentera, Inc., St. Paul, MN (US)

( * ) Notice: Subject to any disclaimer, the term of this patent is extended or adjusted under 35 U.S.C. 154(b) by 286 days.

(21) Appl. No.: 16/710,672

(22) Filed: Dec. 11, 2019

(51) Int. Cl.
| | |
|---|---|
| G01C 11/02 | (2006.01) |
| G01S 19/42 | (2010.01) |
| G06T 7/70 | (2017.01) |
| G06T 7/00 | (2017.01) |

(52) U.S. Cl.
CPC ............ G01C 11/025 (2013.01); G01S 19/42 (2013.01); G06T 7/0012 (2013.01); G06T 7/70 (2017.01); *G06T 2207/10032* (2013.01); *G06T 2207/30128* (2013.01); *G06T 2207/30188* (2013.01); *G06T 2207/30242* (2013.01)

(58) Field of Classification Search
CPC ..... G01C 11/025; G01S 19/42; G06T 7/0012; G06T 7/70; G06T 2207/10032; G06T 2207/30128; G06T 2207/30188; G06T 2207/30242
See application file for complete search history.

(56) References Cited

U.S. PATENT DOCUMENTS

| | | | |
|---|---|---|---|
| 2017/0206648 A1* | 7/2017 | Marra | G01C 21/20 |
| 2018/0025473 A1* | 1/2018 | Contreras | G05D 1/0061 348/144 |
| 2019/0096033 A1 | 3/2019 | Taipale et al. | |

OTHER PUBLICATIONS

Xin Chen; Matei Stroile; Ruisheng Wang; Brad Kohlmeyer; Narayanan Alwar; and Jeff Bach: "Nest Generation Map Making: Geo-Referenced Ground-Level LIDAR Point Clouds for Automatic Retro-Reflective Road Feature Extraction"; Nov. 2009; ACM GIS '9; pp. 488-491. (Year: 2009).*

* cited by examiner

*Primary Examiner* — Siamak Harandi
(74) *Attorney, Agent, or Firm* — Hamre, Schumann, Mueller & Larson, P.C.

(57) ABSTRACT

Systems and methods for providing an accurate determination of above ground level (AGL) altitude for use in precision agriculture. A 3D computer model of an agricultural field is generated by analyzing frames of a video of the agricultural field that have been obtained by a camera on an unmanned aerial vehicle flown over the agricultural field and generating 3D points that are used to create the 3D computer model. The 3D computer model is then scaled by fusing each 3D point with navigation sensor data associated with each frame. An AGL altitude for each 3D point of the scaled 3D computer model can then be determined. In another embodiment, a trajectory of the unmanned aerial vehicle can be determined and used to generate a georeferenced map using images captured by the camera.

14 Claims, 5 Drawing Sheets

UAV ABOVE GROUND LEVEL DETERMINATION FOR PRECISION AGRICULTURE

FIELD

This disclosure relates to precision agriculture and improving the accuracy of analysis of UAV camera images for precision agriculture.

BACKGROUND

Precision agriculture seeks to improve farming management through the use of image analysis. It is known to use unmanned aerial vehicles (UAVs) to fly over agricultural fields and capture images of the fields. The images are then analyzed to make determinations about the agricultural fields, for example yield predictions, the health of crops growing in the fields, the type of crops, the number of crops, soil conditions, the presence of insects or animals, and the like.

In some precision agriculture applications, the above ground level (AGL) altitude is used to convert pixel coordinates of a photographic image into real world coordinates. This conversion is necessary in precision agriculture applications that require conversion from a number of objects appearing in an image (for example, a plant count) to a number of objects per acre.

SUMMARY

In precision agriculture, a UAV is flown over an agricultural field to capture a plurality of images of the field using one or more cameras on the UAV. Systems and methods are described herein for providing an accurate determination of AGL altitude for use in precision agriculture. AGL is the altitude of the UAV above the ground at the point in time when an image is captured by the camera on the UAV. Accurate AGL determinations are useful during analysis of the images for accurately converting the pixel units of measure of the camera images into other suitable units of measure. For example, in one embodiment, the images may be analyzed in order to determine the number of plants per acre which can be used to make yield predictions. The number of plants in each image can be determined using known analysis techniques. However, the conversion from pixel units of measure into useable units of measure, such as the area of the field encompassed by the image, using the accurate AGL determination, is necessary in order to increase the accuracy of determining the number of plants per acre.

As described further below, in one embodiment a technique that fuses visual odometry (for example visual simultaneous localization and mapping) and GPS/IMU information is used to generate accurate real-time AGL determinations. In another embodiment, the fusion of visual odometry and GPS/IMU information can be used to extract an optimized trajectory (i.e. pose of the UAV) at the time each image is captured, where the optimized trajectory can be used for post-flight accurate georeferencing of images captured by the UAV while in flight to create an accurate georeferenced map of the agricultural field using the captured images.

DRAWINGS

FIG. 1 illustrates an example environment in which the precision agriculture techniques described herein can be implemented.

FIG. 2 schematically depicts example components of a UAV described herein.

DETAILED DESCRIPTION

Figure 1:
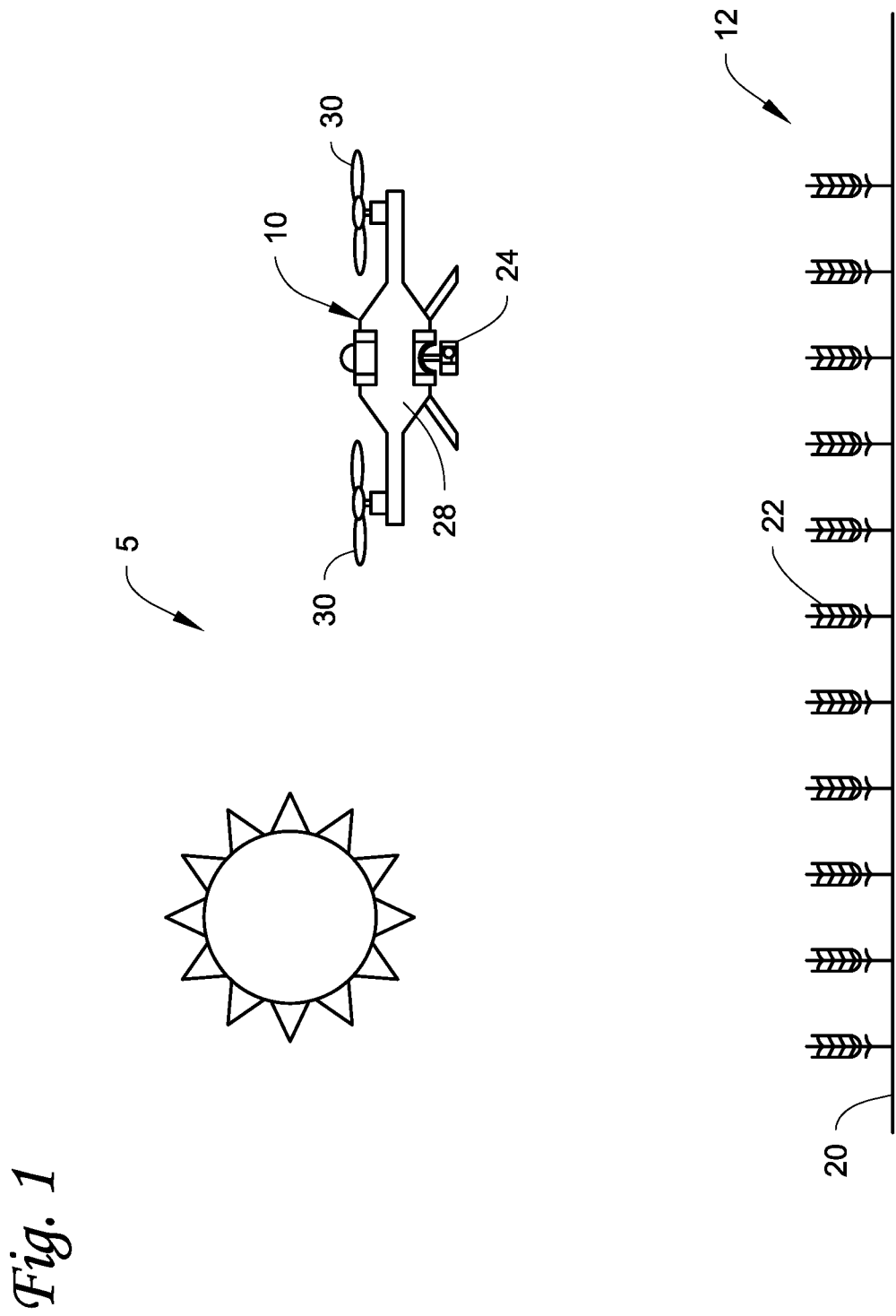

The following is a description of techniques that result in improved analysis of images obtained by one or more cameras on a UAV that is flown over an agricultural field to image the field for use in precision agriculture. The techniques described herein provide a more accurate determination of AGL altitude for use in precision agriculture. AGL is the altitude of the UAV above the ground at the respective point in time when each respective image is captured by the camera. The techniques described herein are not limited to using a UAV. Other aerial vehicles, including manned aerial vehicles, can be flown over the agricultural field to capture the images. In addition, the techniques described herein may also be used in non-agronomy applications, for example imaging and analyzing non-agricultural plants such as trees.

Accurate AGL determinations can be used during analysis of the images for converting the pixel units of measure of the camera images into useable units of measure, which may be referred to as land-based units of measure, for precision agriculture. For example, if one assumes that each camera image is X-by-Y pixels, the pixel units of measure can be converted into a corresponding ground area (measured in units such as, but not limited to, square meters $m^2$ or the like) of the field covered by each image.

In one embodiment, the images may be analyzed in order to determine the number of plants per acre which can be used to make yield predictions. The number of plants in each image can be determined using known analysis techniques. One non-limiting example of analyzing images obtained from a UAV to obtain a plant count is disclosed in U.S. Patent Application Publication US 2019/0096033, which is incorporated by reference herein in its entirety. However, the conversion from pixel units of measure into suitable units of measure, such as the area of the field encompassed by the image, using the accurate AGL determination, is necessary in order to determine the number of plants per acre. The AGL determination described herein can be used in other precision agriculture applications, such as determining weed density (a number of weeds per acre), pest/insect density (a number of pests/insects per acre), a density of nutrient deficient plants (a number of nutrient deficient plants per acre), flower density (a number of flowers on flowering plants per acre), vegetation coverage density (how densely covered is each acre of the field), and the like. The AGL determination can also be used to estimate the height of an object on the ground which object may or may not be an agricultural plant such as, but not limited to, a corn stalk.

The objects in the images that are to be analyzed can be any object(s) that one way wish to detect in an agricultural field in order to make one or more determinations about the agricultural field including, but not limited to, the health of crops growing in the fields, the type of crops, the number of crops, soil conditions, the presence of insects or animals, and the like. Examples of objects that can be detected and analyzed in the images can include, but are not limited to, corn tassels, individual plants, patterns on leaves of plants that may indicate a nutrient or other deficiency, flowers, weeds, insects/pests, animals, and others.

In another embodiment, the images may be analyzed for the purposes of developing a treatment plan for field. The treatment plan would be developed based on the needs of plants, soil or the like in the field as determined by analyzing the images. The treatment plan could be a treatment rate, i.e. a rate at which a material is applied to the soil or to crops growing in the soil, or a rate at which seeds are planted, or a rate at which plants are planted. The treatment plan could also dictate how soil is tilled in the field, such as the depth of tilling. The treatment plan can encompass any type of treatment that one may wish to conduct within the field. Treatments that can be part of a treatment plan include, but are not limited to: fertilizing; seeding; herbicide application; pesticide application; planting rate; planting/no planting; fungicide application; tilling; watering; and harvesting.

FIG. 1 illustrates an example environment 5 where a UAV 10 is used to gather images of an agricultural field 12 by flying over the field 12. The operation of the UAV 10 can be autonomous (i.e. not controlled from the ground by a ground control station during flight), semi-autonomous, or remotely controlled in flight by the ground control station. In this example, the field 12 includes soil 20 and plants/crops 22 growing in the soil 20. At least one camera system 24 (also referred to as an imaging system or an image capture device) is mounted on the UAV 10. The camera system 24 is preferably a video camera that captures a video stream of the field 12.

Figure 2:
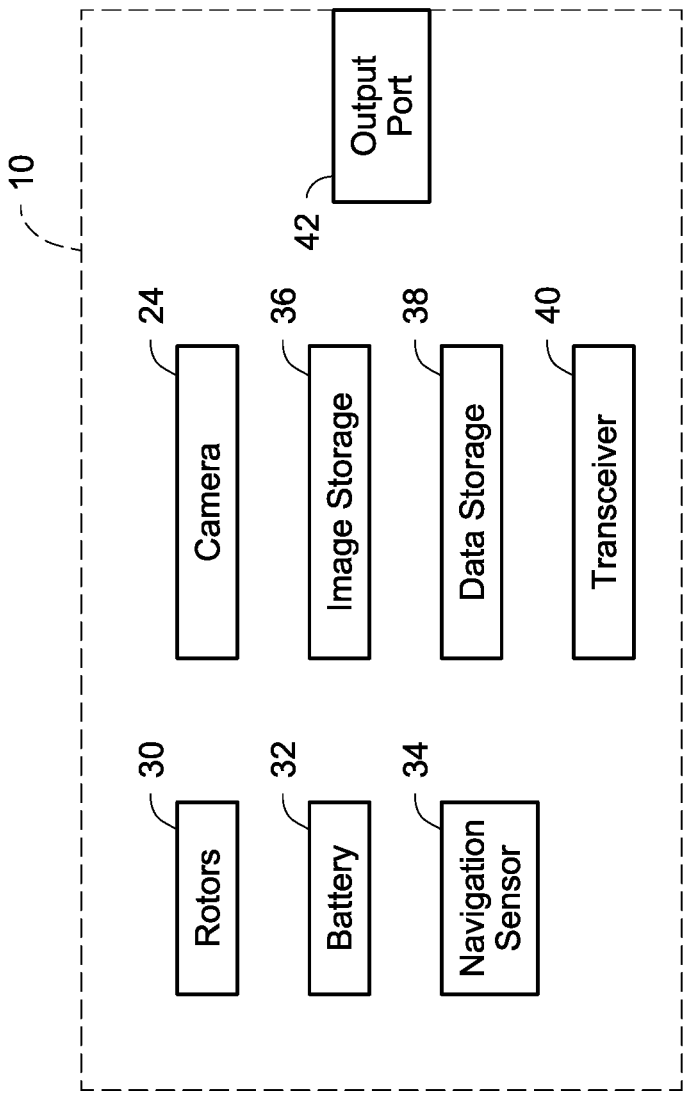

With reference to FIGS. 1 and 2, the UAV 10 itself can be of conventional construction including a central fuselage 28 to which the camera system 24 is mounted, a plurality of, for example four, rotors 30, one or more batteries 32 (which may be rechargeable), and a navigation sensor 34. The image data from the camera system 24, for example in the form of a video stream, can be stored in an image storage 36. Other data, for example location data from the navigation sensor 34, can be stored in another data storage 38 (or stored in the image storage 36). In some embodiments, the image data may be wirelessly transmitted from the UAV 10 to a ground control station (not illustrated) or other receiving entity using an optional transceiver 40. In addition, the UAV 10 can include an output port 42, for example a USB port, or a removable SD card for downloading image data from the UAV 10.

The rotors 30 rotate to provide the lift and propulsion for the UAV 10. The battery 32 provides stored electrical energy for powering the various electrical components of the UAV 10. The navigation sensor 34 may include an inertial measurement unit (IMU), which may include an accelerometer and gyroscope to output UAV 10 roll, pitch, yaw, acceleration, or approximate velocity calculated based on acceleration. The navigation sensor 34 may include a compass to provide heading or a global navigation satellite system (GNSS), such as the Global Positioning System (GPS) to provide location. In an example, the navigation sensor 34 may include a tightly coupled IMU and GNSS system, where the IMU data is used to reduce noise in the GNSS positioning accuracy and the GNSS data is used to reduce inertial positioning noise (e.g., drift). The transceiver 40 (if provided) can be any conventional transceiver known in the art for wirelessly transmitting and receiving data/commands. The camera system 24, the one or more rotors 30, the one or more batteries 32, the navigation sensor 34, the storage 36, 38 and the transceiver 40 are each well known in the art.

In summary, AGL can be determined in the following manner. The UAV is flown over the field to obtain a video stream of the field together with GPS coordinates of each frame of the video. The GPS coordinates can be suitably associated with its respective frame, for example by embedding the GPS coordinates as metadata in the data for its corresponding frame. Visual simultaneous localization and mapping (SLAM or VSLAM) is then used to generate a 3D computer model of the terrain seen by the camera. Thereafter, the GPS information is fused with the 3D computer model data to bring the 3D computer model to proper scale. In some embodiments, the GPS information may be fused with position estimation data for each frame of the camera, which fused data can then be used to create the 3D computer model.

The AGL for each 3D point is then determined. In some embodiments, when the UAV includes an IMU which detects the orientation of the camera at any moment in time, data from the IMU can also be fused with the 3D computer model.

Visual SLAM is a known technique that works by tracking set points through successive camera frames to triangulate their 3D position, while simultaneously using this information to approximate camera pose. The basic goal of visual SLAM is to map the surroundings in relation to its own location. Deep neural networks, graph optimization, Kalman filtering, extended Kalman filtering, and Bayesian filtering can alternatively be used to solve the SLAM and fusion problem to generate the 3D computer model.

Figure 3:
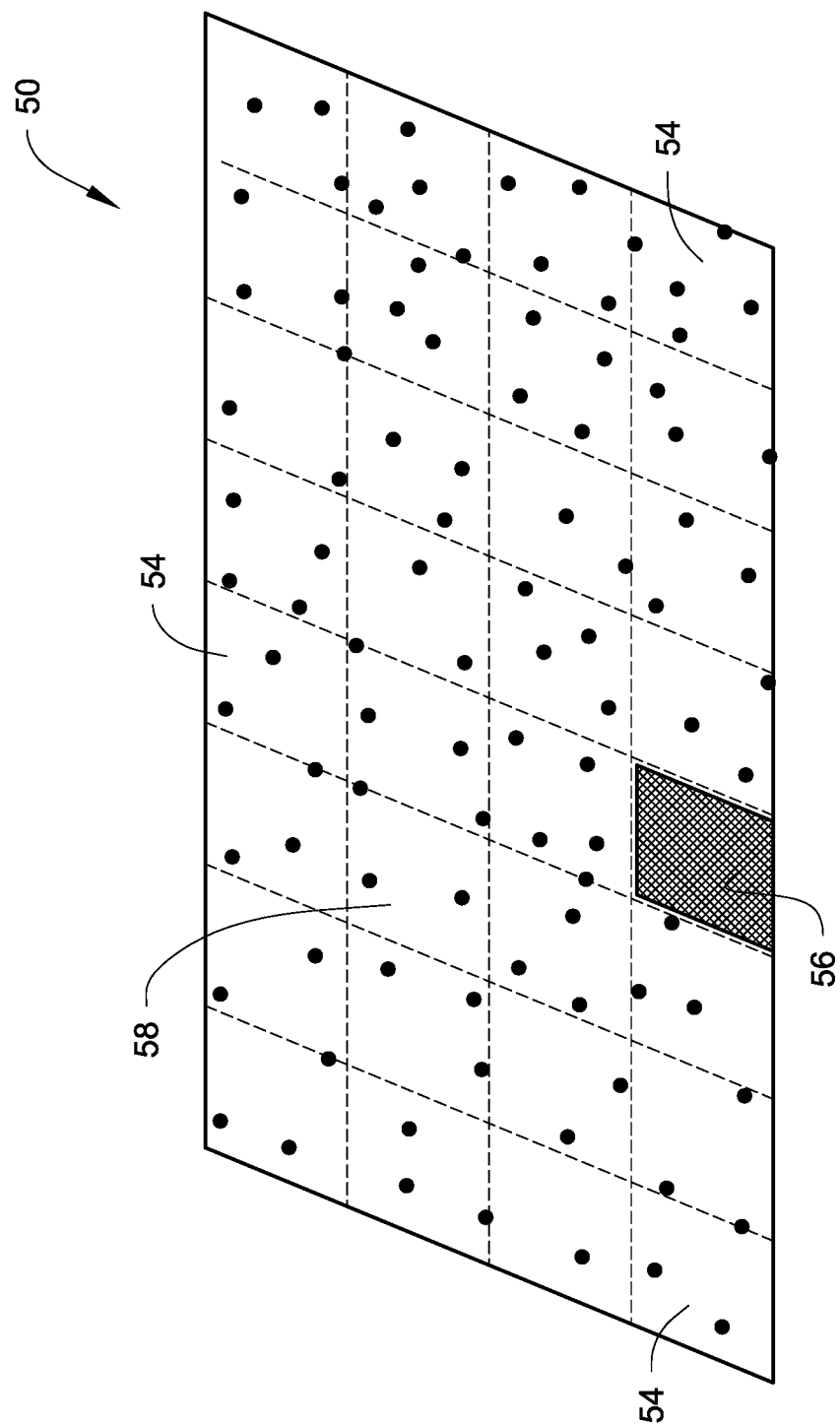
FIG. 3 illustrates a 3D computer model of the terrain seen by the camera on the UAV.
Figure 4:
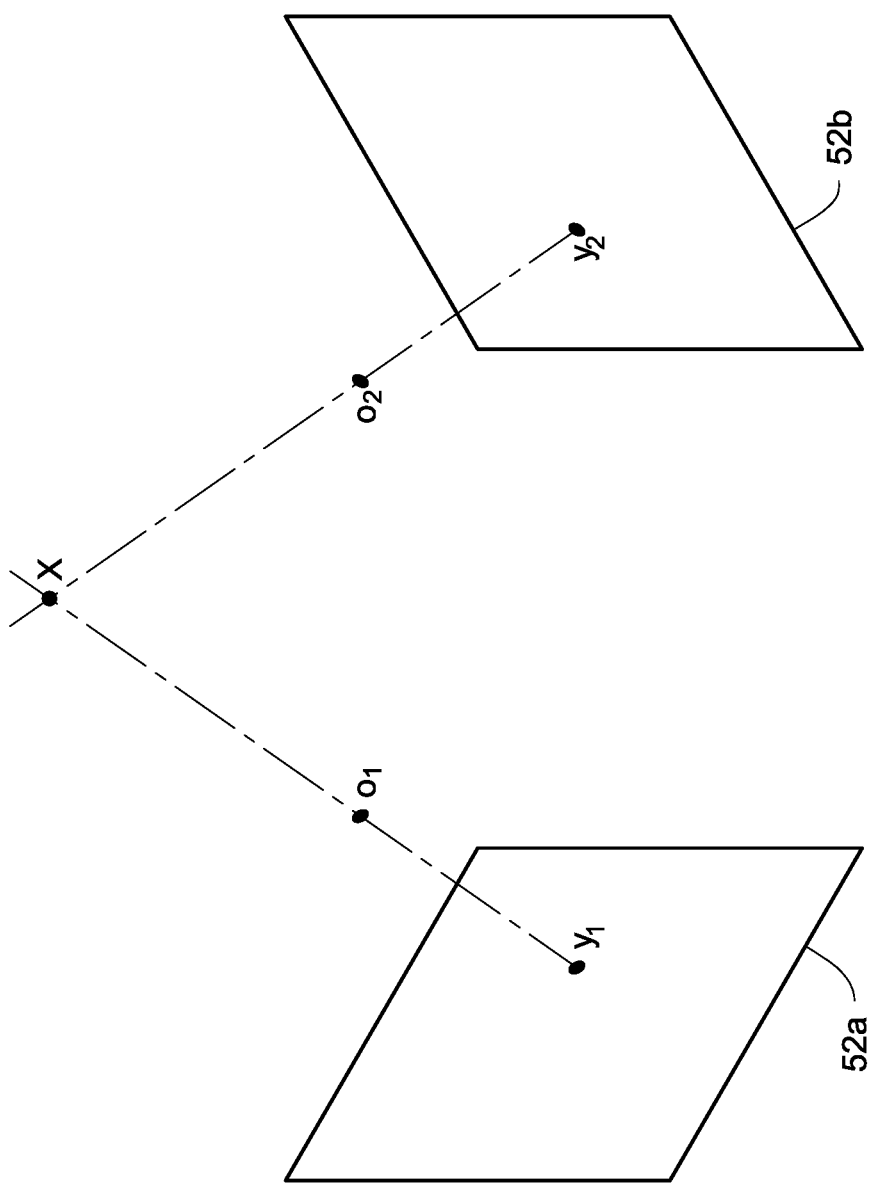
FIG. 4 illustrates the concept of triangulation between consecutive frames of the video captured by the camera on the UAV.

Referring to FIG. 3, visual SLAM uses only the video stream from the camera on the UAV as an input to create a 3D computer model 50 of the terrain the camera sees. The 3D computer model 50 comprises a large number of 3D points that have been computed by the process of triangulation between consecutive frames of the video stream. FIG. 4 illustrates the concept of triangulation between any two consecutive frames 52a, 52b of the video stream captured by the camera on the UAV. Triangulation determines the position of a 3D point, indicted by X, from the frames 52a, 52b which are 2D images. To triangulate, the projection of the 3D point X on the 2D images is found and the matching of the point between its projections to the different 2D images is established. The 3D point X is triangulated by finding the meeting between the rays from the center O1, O2 of the camera for each frame 52a, 52b, through the projection of the 3D point X of the 2D image and the 3D point X. This process can be repeated for each consecutive frames of the video stream to generate a number of the 3D points indicated in FIG. 3 to generate the 3D computer model. In some embodiments, it is not necessary to use every consecutive frame of the video, and some frames of the video can be skipped and disposed between what can be considered two consecutive frames.

Returning to FIG. 3, the resulting 3D computer model is not scaled to a real-world size (for example, measured in meters), but is only scaled in size in relative terms (for example, 1.3 times the initial translation the system computed). Therefore, an accurate AGL cannot be determined directly from the 3D computer model. To add the real-world size information, the GPS information is fused with the 3D computer model.

Fusion of the GPS information can occur using any suitable fusion technique. In one embodiment, each video frame is timestamped and so are the GPS measurements. The timestamping is done based on the same clocking system on the UAV. Therefore, when the pose of each video frame is determined through the visual SLAM, at the same time one knows how much the camera sensor is moved in the real-world in absolute terms (for example, the camera may move 15.3 m between each video frame). The ratio between the real-world translation (for example, 15.3 m) and the visual SLAM computed translation (for example 1.3) is a scale value that is used to multiply all the 3D points of the 3D computer model 50 to bring the 3D computer model 50 to the proper scale (i.e. generate a scaled 3D computer model). With the 3D computer model 50 now at real-world scale (for example, measured in meters), it is possible to accurately determine the AGL.

With continued reference to FIG. 3, to determine the AGL for each video frame, the reconstructed 3D model is segmented into a lattice of adjacent 3D-points segments 54 and, using a simple RANSAC algorithm, the model of a plane 56 is fit in each one of the adjacent 3D points segments. This way, with a majority vote, one can extract the dominant plane 56a and treat it as the ground. The dominant plane is the plane 56 that best describes the 3D point cloud with respect to the RANSAC algorithm, where the majority of the 3D points from the point cloud are within a threshold distance from the plane 56. Once a model of a plane in the 3D space is computed, the perpendicular distance from the estimated camera center to the plane is considered the AGL.

Figure 5:
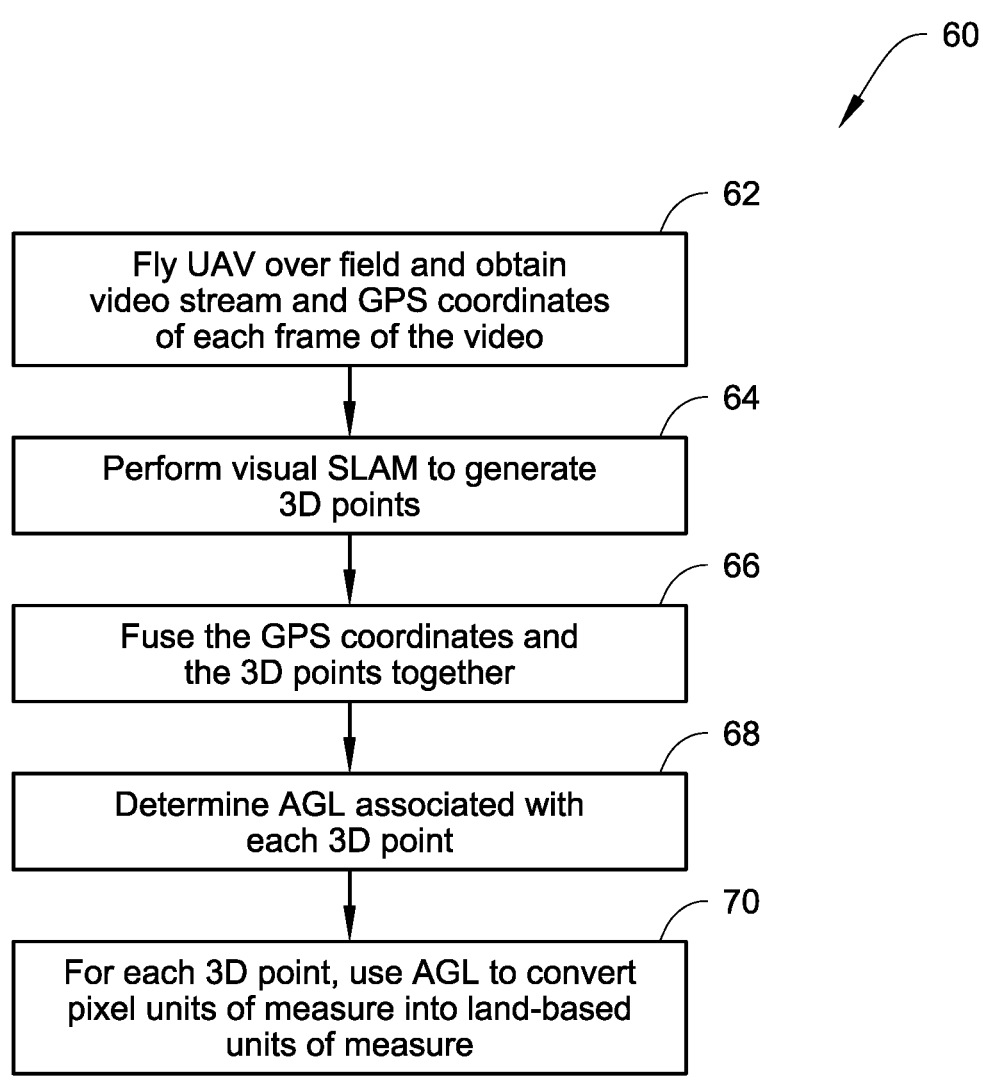
FIG. 5 illustrates a process of determining the AGL and using the AGL determination in precision agriculture.

With reference to FIG. 5, one embodiment of a method 60 of determining AGL is illustrated. At box 62, the UAV is flown over the field and a video stream of the field is obtained. At the same time, GPS coordinates for each frame of the video are obtained. The GPS coordinates data can be embedded into the video stream data, or the GPS data can be stored separately and later associated with their corresponding video frames. At box 64, visual SLAM is performed on the video stream as described above to generate a plurality of 3D points to create a 3D computer model. At box 66, the GPS coordinates data is fused with the 3D points of the 3D computer model. Thereafter, at box 68, the AGL associated with each 3D point is determined. Thereafter, at box 70, for each 3D point, the AGL for each 3D point is used to convert pixel units of measure of the frames into "land-based" units of measure (such as meters). The same AGL can be used to perform the conversion of the units of measure for the two adjacent frames used to determine each 3D point. Or the same AGL can be used to perform the conversion of the units of measure for every frame. In another embodiment, a few AGL measurements can be accumulated, and then an average of the AGLs can be computed and used for the conversion. Using the average is beneficial in removing potential outlier AGL measurements.

Using the accurate AGL determinations, analysis of the images can proceed. For example, a yield prediction can be made by determining the number of plants per acre. The AGL determinations described herein can be used in other precision agriculture applications as well.

Fusion of the GPS coordinates data with the 3D points of the 3D computer model can also useful for generating an accurate georeferenced map using the original resolution images captured by the camera 24. In one embodiment, the georeferenced map can be created after the UAV 10 has landed upon completing its imaging mission. In particular, fusion of visual odometry and GPS/IMU information can be used to extract an optimized trajectory (i.e. pose of the UAV) at the time each image is captured, where the optimized trajectory can be used for post-flight accurate georeferencing of images captured by the UAV while in flight to create an accurate georeferenced map of the agricultural field using the captured images. For example, the trajectory, i.e. the time and camera pose (i.e. position and orientation), of the UAV 10 during its imaging mission is known from the fused data and the GPS/IMU data for each 3D point. In addition, each of the images captured by the camera 24 have a time stamp associated therewith. Using the trajectory data and the time stamp for each image, the pose (i.e. position and orientation of the camera when each image is captured) of each image relative to the ground is known. The images can then be accurately projected on an image of the ground surface and combined together, for example using conventional image stitching techniques, to create the accurate georeferenced map.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of precision agriculture, comprising:
generating a 3D computer model of an agricultural field by analyzing frames of a video of the agricultural field that have been obtained by a camera on an unmanned aerial vehicle flown over the agricultural field and generating 3D points that are used to create the 3D computer model;
modifying the 3D computer model by fusing each 3D point with navigation sensor data associated with each frame and generating a scaled 3D computer model;
thereafter determining an above ground level altitude for each 3D point of the scaled 3D computer model;
using the determined above ground level altitude for each 3D point in a precision agriculture analysis on the agricultural field.

2. The method of precision agriculture of claim 1, comprising using at least one of the determined above ground level altitudes to convert pixel units of measure of one of the frames into land-based units of measure.

3. The method of precision agriculture of claim 2, further comprising determining a number of objects in the agricultural field per acre.

4. The method of precision agriculture of claim 2, further comprising making a yield prediction of the agricultural field.

5. The method of claim 1, wherein the navigation sensor data comprises global positioning system data.

6. The method of claim 1, comprising generating the 3D computer model using visual simultaneous localization and mapping.

7. The method of claim 1, further comprising determining a trajectory of the unmanned aerial vehicle, and using the trajectory to generate a georeferenced map using images captured by the camera.

8. At least one non-transitory computer-readable storage medium, comprising a plurality of instructions that, responsive to being executed with processor circuitry of a computer-controlled device, cause the computer-controlled device to:
generate a 3D computer model of an agricultural field by analyzing frames of a video of the agricultural field that have been obtained by a camera on an unmanned aerial vehicle flown over the agricultural field and generating 3D points that are used to create the 3D computer model;
modify the 3D computer model by fusing each 3D point with navigation sensor data associated with each frame and generating a scaled 3D computer model;
thereafter determine an above ground level altitude for each 3D point of the scaled 3D computer model; and use the determined above ground level altitude for each 3D point in a precision agriculture analysis on the agricultural field.

9. The non-transitory computer-readable storage medium of claim 8, the instructions further causing the computer-controlled device to:
use the above ground level altitude for each 3D point to convert pixel units of measure of each of the frames into land-based units of measure.

10. The non-transitory computer-readable storage medium of claim 8, the instructions further causing the computer-controlled device to:
determine a number of objects in the agricultural field per acre.

11. The non-transitory computer-readable storage medium of claim 10, the instructions further causing the computer-controlled device to:
make a yield prediction of the agricultural field.

12. The non-transitory computer-readable storage medium of claim 8, wherein the navigation sensor data comprises global positioning system data.

13. The non-transitory computer-readable storage medium of claim 8, the instructions further causing the computer-controlled device to:
use visual simultaneous localization and mapping to generate the 3D computer model.

14. The non-transitory computer-readable storage medium of claim 8, the instructions further causing the computer-controlled device to:
determine a trajectory of the unmanned aerial vehicle, and using the trajectory to generate a georeferenced map using images captured by the camera.

* * * * *